(No Model.)

A. DECKER.
CORN HUSKER.

No. 357,523. Patented Feb. 8, 1887.

Witnesses.
A. Ruppert.
R. E. Grant

Inventor.
A. Decker,
Per
Thomas P. Simpson,
atty.

United States Patent Office.

ALONZO DECKER, OF OLD FORT, OHIO, ASSIGNOR OF ONE-HALF TO MAY WICKERT.

CORN-HUSKER.

SPECIFICATION forming part of Letters Patent No. 357,523, dated February 8, 1887.

Application filed February 17, 1886. Renewed January 17, 1887. Serial No. 224,572. (No model.)

*To all whom it may concern:*

Be it known that I, ALONZO DECKER, a citizen of the United States, residing at Old Fort, in the county of Seneca and State of Ohio, have invented certain new and useful Improvements in Corn-Huskers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention relates, generally, to hand corn-huskers, and has for its object to arrange the hook in such a position that in tying up the fodder it may not lacerate the hand which is not holding it or inflict a wound upon any part of the person; also, to make the hook independent of the holder, so that it may be readily detached or replaced without throwing away the whole implement.

Figure 1:
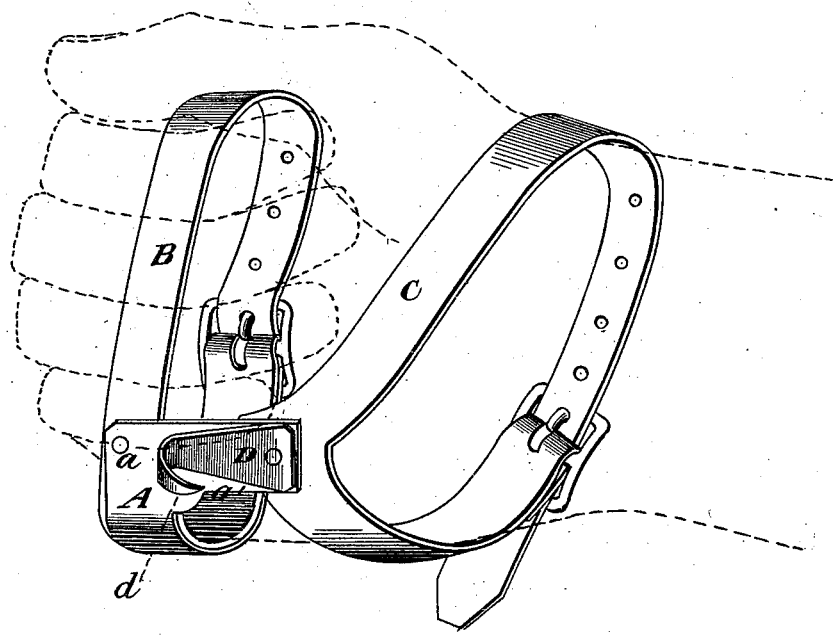
Figure 2:
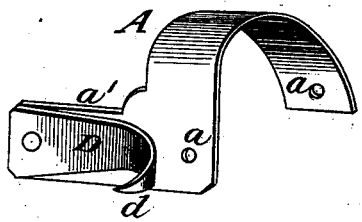

In the drawings, Figure 1 is a perspective view showing my husker in place upon the hand and with all the necessary straps. Fig. 2 is a detail perspective view of the hook and its holder.

A represents the holder, made on a curve to receive in its concavity the little finger, and provided with the holes $a\,a$, through which pass rivets, which fasten it to the straps B C. These rivets are made of soft metal, so as to be easily removed. The holder has a right-angled arm, $a'$.

D is the grab-hook with which the corn-shuck is opened, and is made entirely independent of the holder A, so that it can be replaced by another when no longer fit for use. It is detachably riveted to the arm $a'$.

The strap B is arranged in the same plane with the curved holder A, so as to pass around the fingers and buckle, as shown in Fig. 1 of the drawings, while the strap C passes around the wrist, the two securing the implement firmly to the hand.

The grab-hook D is arranged on the holder A so as to be in line with the fingers, and the point of the hook is turned rearwardly or toward the arm. With this construction and arrangement of the hook the hand cannot be hurt in husking or in tying up fodder. In husking the hook is thrown a little below the middle of the ear, and this greatly facilitates the operation. Again, by using a finger and a wrist strap the hook can never change its position, and the hand can be used with perfect freedom.

What I claim as new, and desire to protect by Letters Patent, is—

A corn-husker consisting of two straps, one for the fingers and the other for the wrist, a curved hook-holder having a right-angled arm at one end, and a detachable hook having its point arranged toward the rear at one end, substantially as shown and described.

In testimony whereof I affix my signature in presence of two witnesses.

ALONZO DECKER.

Witnesses:
I. L. GREENE,
JOHN R. GOPHART.